United States Patent
Aisaka et al.

(10) Patent No.: US 8,826,642 B2
(45) Date of Patent: Sep. 9, 2014

(54) DEVICE FOR PURIFYING EXHAUST GAS OF INTERNAL COMBUSTION ENGINE

(75) Inventors: Takeho Aisaka, Toyota (JP); Takashi Nakamura, Toyota (JP); Takuya Matsumoto, Toyota (JP); Makoto Sato, Toyota (JP); Hiroshi Sawada, Susono (JP); Yasushi Iwazaki, Susono (JP); Yusuke Kawamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 102 days.

(21) Appl. No.: 13/640,452

(22) PCT Filed: Apr. 13, 2010

(86) PCT No.: PCT/JP2010/056622
§ 371 (c)(1),
(2), (4) Date: Oct. 30, 2012

(87) PCT Pub. No.: WO2011/128983
PCT Pub. Date: Oct. 20, 2011

(65) Prior Publication Data
US 2013/0199161 A1    Aug. 8, 2013

(51) Int. Cl.
*F01N 3/00*    (2006.01)

(52) U.S. Cl.
USPC .................... 60/276; 60/277; 60/299; 60/301

(58) Field of Classification Search
USPC .................................. 60/272–324
See application file for complete search history.

(56) References Cited

U.S. PATENT DOCUMENTS

| | | | | |
|---|---|---|---|---|
| 6,282,889 B1 * | 9/2001 | Kakuyama et al. | ............. | 60/285 |
| 6,481,201 B2 * | 11/2002 | Kako et al. | ..................... | 60/285 |
| 7,143,574 B2 * | 12/2006 | Lewis et al. | ..................... | 60/277 |
| 2004/0000135 A1 * | 1/2004 | Uchida | ............. | 60/277 |
| 2010/0307135 A1 * | 12/2010 | Miyamoto et al. | ............. | 60/277 |

FOREIGN PATENT DOCUMENTS

| | | |
|---|---|---|
| JP | 8-100635 A | 4/1996 |
| JP | 2001-098982 A | 4/2001 |
| JP | 2004-028029 A | 1/2004 |
| JP | 2004-225684 A | 8/2004 |
| JP | 2005-098205 A | 4/2005 |
| JP | 2010-043624 A | 2/2010 |

* cited by examiner

*Primary Examiner* — Jesse Bogue
(74) *Attorney, Agent, or Firm* — Gifford, Krass, Sprinkle, Anderson & Citkowski, P.C.

(57) ABSTRACT

An electronic control device calculates the maximum actual oxygen storage capacity of a catalyst. The gradient of a linear expression formed between the catalyst temperature and the maximum oxygen storage capacity of the catalyst is stored for each degradation level of the catalyst. The gradient can be learned in accordance with the same temperature of the catalyst and the maximum actual oxygen storage capacity. When the maximum actual oxygen storage capacity is calculated, it is revised in accordance with the temperature of the catalyst, a reference temperature, the linear expression, and the learned gradient. The revised maximum oxygen storage capacity which is the maximum oxygen storage capacity when the temperature of the catalyst during the same calculation period is equal to the reference temperature is then calculated. If a response delay is detected in the output of an oxygen sensor, the gradient of the learned linear expression is discarded.

5 Claims, 11 Drawing Sheets

US 8,826,642 B2

DEVICE FOR PURIFYING EXHAUST GAS OF INTERNAL COMBUSTION ENGINE

FIELD OF THE INVENTION

The present invention relates to an exhaust purifying device for an internal combustion engine that includes a catalyst, which is capable of storing oxygen and is located in the exhaust passage of an internal combustion engine, and an oxygen sensor, which is located downstream of the catalyst in an exhaust stream. The exhaust purifying device calculates a maximum oxygen storage amount of the catalyst on the basis of engine operating conditions and changes in an output of the oxygen sensor.

BACKGROUND OF THE INVENTION

This kind of exhaust purifying device for an internal combustion engine is described in Patent Document 1, for example. Conventional exhaust purifying devices, including the one described in Patent Document 1, each include a catalyst capable of storing oxygen and located in an exhaust passage of the internal combustion engine and an oxygen sensor located downstream of the catalyst in an exhaust stream. Here, a commonly known oxygen sensor has a property to output approximately 0 V when the air-fuel ratio of an exhaust is leaner than the stoichiometric air-fuel ratio and to output approximately 1 V when the air-fuel ratio of the exhaust is richer than the stoichiometric air-fuel ratio.

Incidentally, the more the catalyst deteriorates, the more deceased becomes the oxygen-storing capability of the catalyst, or the maximum oxygen storage amount. Under such circumstances, a conventionally used arrangement is to calculate the maximum oxygen storage amount of the catalyst to enable recognition of the degree of degradation of the catalyst on the basis of the maximum oxygen storage amount in the below-described manner. Specifically, the conventional arrangement is to perform active control of the air-fuel ratio to forcibly alter the air-fuel ratio of the exhaust that flows into the catalyst and calculate the maximum oxygen storage amount of the catalyst on the basis of engine operating conditions and changes in an output of the oxygen sensor.

Referring now to FIG. 10, active air-fuel ratio control operation commonly performed in the prior art is generally described hereunder.

FIG. 10 is a timing chart, in which section (a) represents changes in the air-fuel ratio of the exhaust that flows into the catalyst, section (b) represents changes in an output voltage of the oxygen sensor, and section (c) represents changes in the amount of oxygen stored by the catalyst during execution of the active air-fuel ratio control operation commonly performed in the prior art.

As shown in FIG. 10, the air-fuel ratio of the exhaust that flows into the catalyst is forcibly made higher than the stoichiometric air-fuel ratio at point in time t31 in the beginning so that the catalyst stores oxygen. When it becomes impossible for the catalyst to store any more oxygen, lean exhaust flows out on a downstream side of the catalyst, so that the output of the oxygen sensor changes from 1 V, which corresponds to rich mixture, to 0 V, which corresponds to lean mixture. Then, at point in time t32 where the output of the oxygen sensor becomes equal to V2, which corresponds to the stoichiometric air-fuel ratio, the air-fuel ratio of the exhaust that flows into the catalyst is forcibly made lower than the stoichiometric air-fuel ratio, so that oxygen is released from the catalyst. When it becomes impossible for the catalyst to release any more oxygen, rich exhaust flows out on the downstream side of the catalyst, so that the output of the oxygen sensor changes from 0 V to 1 V, which is representative of a rich mixture. Then, at point in time t33, where the output of the oxygen sensor becomes equal to V2, the air-fuel ratio of the exhaust that flows into the catalyst is forcibly made higher than the stoichiometric air-fuel ratio, so that the catalyst stores oxygen. When it becomes impossible for the catalyst to store any more oxygen, the output of the oxygen sensor changes from 1 V to 0 V, which is representative of a lean mixture. Then, at point in time t34, the output of the oxygen sensor becomes equal to V2. Here, the amount of oxygen released from the catalyst during a time period from the point in time t32 to the point in time t33 corresponds to the maximum oxygen storage amount of the catalyst. It is therefore possible to calculate the amount of oxygen released from the catalyst per unit time on the basis of engine operating conditions, such as the amount of injected fuel and the air-fuel ratio of the exhaust, and calculate the maximum oxygen storage amount by integrating the amount of oxygen released per unit time over the aforementioned time period (t32 to t33). Also, the amount of oxygen that has flowed into the catalyst during a time period from the point in time t33 to the point in time t34 corresponds to the maximum oxygen storage amount of the catalyst. It is therefore possible to calculate the amount of oxygen that has flowed into the catalyst per unit time on the basis of the engine operating conditions and calculate the maximum oxygen storage amount by integrating the amount of oxygen that has flowed into the catalyst per unit time over the aforementioned time period (t33 to t34).

Incidentally, the maximum oxygen storage amount of the catalyst varies with the temperature of the catalyst, as well as with the degree of degradation thereof.

Referring now to FIG. 11, a relationship between the temperature of a catalyst and the maximum oxygen storage amount thereof is described, by way of example, with reference to two catalysts of which the degrees of degradation differ from each other.

FIG. 11 is a graph representing the relationship between the temperature of each catalyst and the maximum oxygen storage amount thereof, wherein a solid line indicates changes in the maximum oxygen storage amount of a catalyst of which the degree of degradation is low and an alternate long and short dashed line indicates changes in the maximum oxygen storage amount of another catalyst of which the degree of degradation is high.

As shown in FIG. 11, the maximum oxygen storage amount Cmax of a catalyst increases with an increase in temperature TC thereof. Also, the maximum oxygen storage amount Cmax of a catalyst decreases with an increase in the degree of degradation thereof as mentioned earlier. Also, the difference between the maximum oxygen storage amount Cmax of the catalyst of which the degree of degradation is low and the maximum oxygen storage amount Cmax of the catalyst of which the degree of degradation is high becomes smaller as the temperature TC of the catalysts drops. As indicated by arrows in FIG. 11, however, there exist variations in calculated maximum oxygen storage amount (hereinafter referred to as actual maximum oxygen storage amount) CmaxA. Especially at low catalyst temperatures (T1<catalyst temperature TC<T2) where the actual maximum oxygen storage amount CmaxA is small, these variations greatly affect the actual maximum oxygen storage amount CmaxA, making it impossible to calculate the actual maximum oxygen storage amount CmaxA with high accuracy. Therefore, in order to calculate the actual maximum oxygen storage amount CmaxA with high accuracy, it is necessary to perform calculation when the temperatures of the catalyst is high (T2<catalyst temperature TC<T3). In this case, however, opportunities for calculating the actual maximum oxygen storage amount CmaxA are limited to occasions where the temperatures of the catalyst is high and, thus, there arises a problem that the catalyst can be examined for degradation thereof on limited occasions only.

In contrast, according to a technique described in Patent Document 1, the maximum oxygen storage amount increases proportionally with an increase in the temperature TC of the catalyst in a temperature range in which the catalyst is activated to a certain extent, in a range where the temperature TC of the catalyst is from T1 to T4 in the example of FIG. 11. Accordingly, focusing on the fact that the relationship between the temperature of the catalyst and the maximum oxygen storage amount thereof can be approximated by a linear equation and the gradient of the linear equation differs with the degree of degradation of the catalyst, an attempt is made to provide increased opportunities for calculating the actual maximum oxygen storage amount CmaxA in the below-described manner.

Referring now to FIG. 12, a relationship between the temperature of a catalyst and the maximum oxygen storage amount thereof as well as the gradient of a linear equation are described, by way of example, with reference to five catalysts of which the degrees of degradation differ from one another.

FIG. 12 is a graph representing the relationship between the temperature of each catalyst and the maximum oxygen storage amount thereof by a linear equation. In FIG. 12, a solid line L1 indicates changes in the maximum oxygen storage amount Cmax of a catalyst which is not degraded at all. Also, a short dashed line L2, an alternate long and short dashed line L3 and an alternate long and two short dashed line L4 indicate changes in the maximum oxygen-storing amounts Cmax of catalysts in the order of increasing degrees of degradation. Further, a long dashed line L5 indicates changes in the maximum oxygen storage amount Cmax of a catalyst with a maximum degree of degradation.

As indicated by the solid line L1 in FIG. 12, the maximum oxygen storage amount Cmax of the catalyst that is not degraded at all does not depend on the temperature TC of the catalyst and, thus, gradient G1 of the maximum oxygen storage amount Cmax with respect to the temperature TC of the catalyst becomes approximately 0. Also, as indicated by the short dashed line L2 and the alternate long and short dashed line L3 in FIG. 12, the more the degree of degradation increases from a state in which the catalyst is not degraded at all, the more gradients G2, G3 increase (G1<G2<G3). Further, as indicated by the alternate long and two short dashed line L4 and the long dashed line L5 in FIG. 12, the more the degree of degradation increases after having increased to a certain extent, the more gradient G4 decreases (G3>G4). Additionally, the maximum oxygen storage amount Cmax of the catalyst of which the degree of degradation is maximized does not depend on the temperature TC of the catalyst and, thus, gradient G5 of the maximum oxygen storage amount Cmax becomes approximately 0.

Taking the above in consideration, a function satisfied by the temperature TC of the catalyst and the actual maximum oxygen storage amount CmaxA thereof indicated in FIG. 12, specifically, the gradient of the linear equation, is determined in advance for each degree of degradation of the catalyst, and relationships between the temperature TC of the catalyst and the actual maximum oxygen storage amount CmaxA and gradients G of linear equations that specify degrees of degradation of the catalyst corresponding to these relationships are stored in storage means of a control unit. The control unit learns the gradient G of the linear equation corresponding to the degree of degradation of the catalyst on the basis of the actual maximum oxygen storage amount CmaxA calculated when the temperature TC of the catalyst is within a learning temperature range (T2<catalyst temperature TC<T3 in the example of FIG. 11) and the temperature TC of the catalyst during a period of calculation of the actual maximum oxygen storage amount CmaxA so that the actual maximum oxygen storage amount CmaxA will not be calculated at the same value despite different degrees of degradation. Then, when the actual maximum oxygen storage amount CmaxA of the catalyst is calculated anew, the calculated actual maximum oxygen storage amount CmaxA is corrected on the basis of the temperature TC of the catalyst during the same period of calculation, a reference temperature TCb (T2<TCb<T3), equation (1) below which is a linear equation, and the already learned gradient G of the linear equation. In this way, the corrected maximum oxygen storage amount Cmaxnrml, which is the maximum oxygen storage amount that would be achieved if the temperature TC of the catalyst has remained at the reference temperature TCb during the period of calculation, is calculated.

$$Cmaxnrml = CmaxA + G(TCb - TC) \quad (1)$$

Referring now to FIG. 13, an example of how the corrected maximum oxygen storage amount Cmaxnrml is calculated is described.

FIG. 13 is a graph representing a relationship among the temperature of a catalyst, the actual maximum oxygen storage amount and the corrected maximum oxygen storage amount. In FIG. 13, a solid line indicates the actual maximum oxygen storage amount CmaxA of a catalyst of which the degree of degradation is low and an alternate long and short dashed line indicates the corrected maximum oxygen storage amount Cmaxnrml of the catalyst. A dashed line indicates the actual maximum oxygen storage amount CmaxA and the corrected maximum oxygen storage amount Cmaxnrml of a catalyst of which the degree of degradation is maximum.

As is obvious from FIG. 13, the corrected maximum oxygen storage amount Cmaxnrml becomes equal to the value of the actual maximum oxygen storage amount CmaxA at the reference temperature TCb, because the actual maximum oxygen storage amount CmaxA is corrected regardless of the temperature TC of the catalyst. This arrangement makes it unnecessary to prepare determination values for individual temperatures of the catalyst and simplifies the determination process performed in a configuration for determining the degree of degradation of the catalyst on the basis of a comparison between the maximum oxygen storage amount of the catalyst and the determination value, for example.

PRIOR ART DOCUMENT

Patent Document

Patent Document 1: Japanese Laid-Open Patent Publication No. 2004-28029

SUMMARY OF THE INVENTION

In an exhaust purifying device for an internal combustion engine, there is likelihood that a response delay may occur in an output of an oxygen sensor. In such a case, the accuracy of calculation of the actual maximum oxygen storage amount CmaxA will decrease owing to the response delay of the output of the oxygen sensor. Thus, the gradient of a linear equation corresponding to the degree of degradation of the catalyst is learned on the basis of the actual maximum oxygen storage amount CmaxA and the corrected maximum oxygen storage amount Cmaxnrml is calculated on the basis of the same gradient. Consequently, a problem may arise that the corrected maximum oxygen storage amount Cmaxnrml cannot be calculated with high accuracy.

Accordingly, it is an objective of the invention to provide an exhaust purifying device for an internal combustion engine capable of avoiding a reduction in the accuracy of calculation of a corrected maximum oxygen storage amount that may result from the occurrence of a response delay of an output of an oxygen sensor.

Means for solving the aforementioned problems as well as operational features and advantages thereof are described hereinbelow.

(1) The present invention provides an exhaust purifying device for an internal combustion engine. The device includes a catalyst that is capable of oxygen storage and is located in an exhaust passage of the internal combustion engine, an oxygen sensor located in the exhaust passage downstream of the catalyst in an exhaust stream, a calculating section for calculating a maximum oxygen storage amount of the catalyst on the basis of an engine operating condition and changes in an output of the oxygen sensor, a temperature estimating section for estimating the temperature of the catalyst, a memory section, a learning section, a correcting section, an anomaly detecting section, and a discarding section. The memory section stores in advance a function that is satisfied between the temperature of the catalyst and the maximum oxygen storage amount of the catalyst at the same temperature at each of specific degrees of degradation of the catalyst for each degree of degradation of the catalyst. When the maximum oxygen storage amount of the catalyst has been calculated by the calculating section, the learning section learns the function corresponding to the current degree of degradation of the catalyst on the basis of the temperature and the maximum oxygen storage amount of the catalyst if the temperature of the catalyst estimated in a period of calculation of the maximum oxygen storage amount falls within a predetermined learning temperature range. When the maximum oxygen storage amount of the catalyst has been calculated by the calculating section, the correcting section corrects the maximum oxygen storage amount calculated by the calculating section on the basis of the temperature of the catalyst estimated in the period of calculation, a reference temperature and the already learned function in order to calculate a corrected maximum oxygen storage amount that is the maximum oxygen storage amount that would be achieved if the temperature of the catalyst has remained at the reference temperature during the period of calculation. The anomaly detecting section detects an abnormal response delay of the output of the oxygen sensor. The discarding section discards the function already learned by the learning section when the abnormal response delay of the output of the oxygen sensor has been detected by the anomaly detecting section.

According to this configuration, when an abnormal response delay has been detected, the exhaust purifying device determines that the reliability of the maximum oxygen storage amount of the catalyst calculated before this detection is low and the reliability of functions learned on the basis of such maximum oxygen storage amount is low, and thus discards the functions that have thus far been learned. For this reason, it becomes possible to prevent a situation in which the corrected maximum oxygen storage amount of the catalyst is calculated on the basis of the functions having low reliability. Therefore, it is made possible to avoid a reduction in the accuracy of calculation of the corrected maximum oxygen storage amount caused by the occurrence of a response delay of the output of the oxygen sensor. Meanwhile, it is desirable to set the predetermined degree for evaluating the degree of the response delay of the output of the oxygen sensor through an experiment or simulation conducted by using the catalyst and the oxygen sensor.

(2) The above described invention may be embodied such that the anomaly detecting section detects a response time of the output of the oxygen sensor and determines that there is an abnormal response delay of the output of the oxygen sensor if the degree of deviation of the detected response time from a response time of the output that occurs when the output of the oxygen sensor is normal is equal to or greater than a predetermined degree.

(3) In accordance with one aspect of the present invention, a relationship between the temperature of the catalyst and the maximum oxygen storage amount of the catalyst at the same temperature at each of the specific degrees of degradation of the catalyst is approximated by a predetermined approximate expression. The memory section stores in advance a coefficient of the approximate expression for each of the specific degrees of degradation of the catalyst. When the maximum oxygen storage amount of the catalyst has been calculated by the calculating section, the learning section learns the coefficient corresponding to the current degree of degradation of the catalyst on the basis of the temperature of the catalyst estimated in the period of calculation and the maximum oxygen storage amount thereof. When the maximum oxygen storage amount of the catalyst has been calculated by the calculating section, the correcting section corrects the maximum oxygen storage amount calculated by the calculating section on the basis of the temperature of the catalyst estimated in the period of calculation, the reference temperature, the approximate expression and the already learned coefficient.

The relationship between the temperature of the catalyst and the maximum oxygen storage amount thereof at the same temperature at each of the specific degrees of degradation of the catalyst can be approximated by a predetermined approximate expression. Therefore, if there is made an arrangement for storing in advance a coefficient of the approximate expression for each of the specific degrees of degradation of the catalyst, learning the coefficient and correcting the maximum oxygen storage amount on the basis of the approximate expression and the already learned coefficient, it becomes possible to simplify the configuration of the memory section, the learning section and the correcting section.

(4) The aspect of the above item (3) can be embodied such that the predetermined approximate expression is a linear equation, and the coefficient is the gradient of the linear equation.

DETAILED DESCRIPTION OF THE INVENTION

Referring to FIGS. 1 to 9, an exhaust purifying device for an internal combustion engine according to the present invention will be described hereinbelow with reference to an embodiment realized as an exhaust purifying device for a port-injection type gasoline engine (hereinafter referred to as the internal combustion engine 1) mounted on a vehicle.

Figure 1:
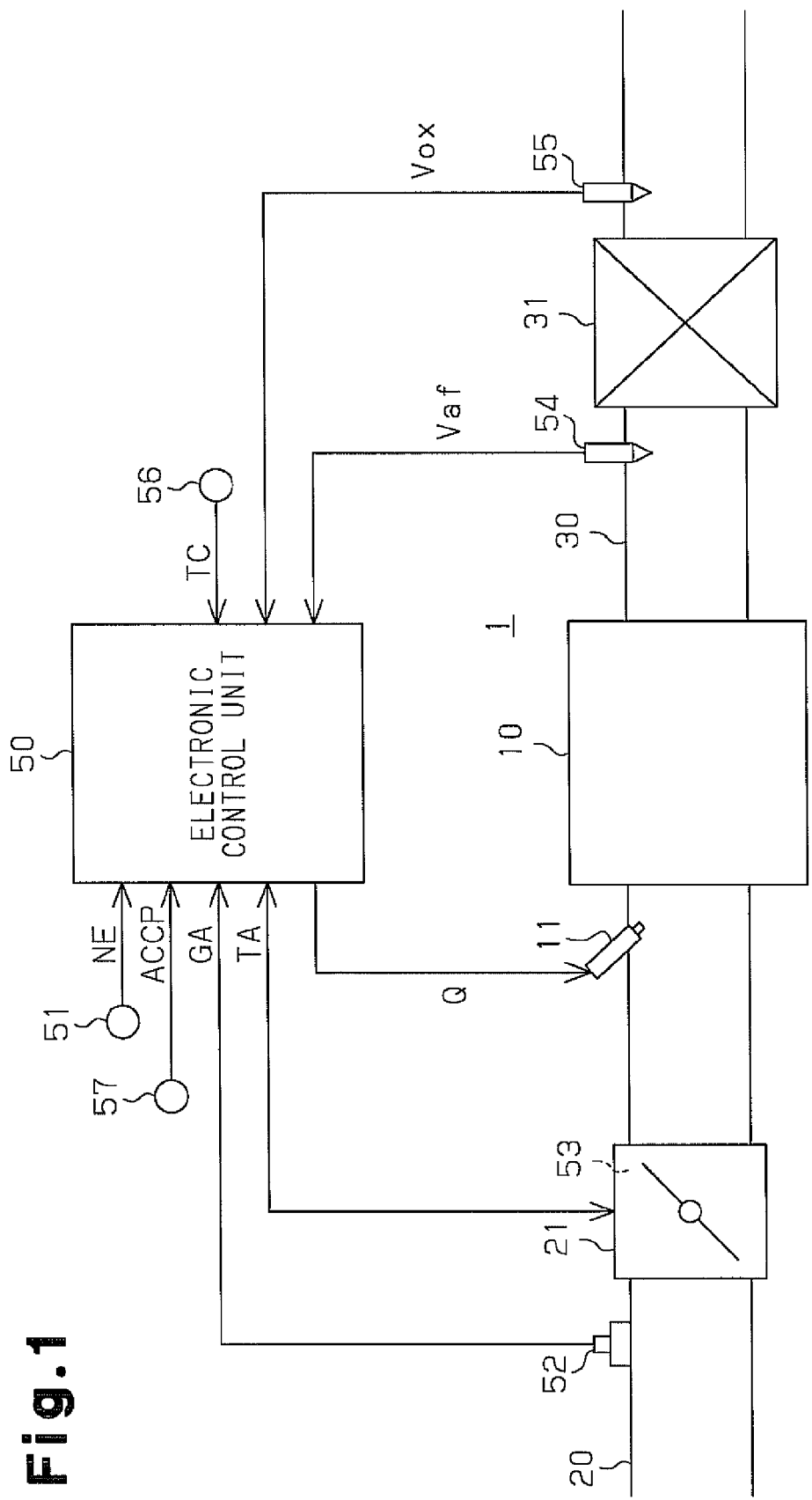
FIG. 1 is a schematic diagram depicting a general configuration of an internal combustion engine and an electronic control unit for controlling the internal combustion engine in one embodiment of an exhaust purifying device for an internal combustion engine according to the present invention.

FIG. 1 depicts a general configuration of the internal combustion engine 1 and an electronic control unit 50 for controlling the internal combustion engine 1.

As shown in FIG. 1, the internal combustion engine 1 is provided with a combustion chamber 10, an intake passage 20 and an exhaust passage 30. The intake passage 20 is a channel for supplying intake air to the combustion chamber 10 with a throttle valve 21 for regulating the amount of intake air provided halfway in the intake passage 20. In the intake passage 20, there is also provided a fuel injector 11 for injecting fuel into an intake port of the intake passage 20. The intake air supplied through the intake passage 20 and the fuel injected from the fuel injector 11 are mixed, together forming an air-fuel mixture, and this mixture is fed into the combustion chamber 10. The mixture is compressed by a piston in the combustion chamber 10 and is combusted when ignited by a spark produced by a spark plug. Energy of expansion produced by combustion turns a crankshaft which is an output shaft of the internal combustion engine 1.

After combustion, exhaust gas is discharged from the combustion chamber 10 to the exterior through the exhaust passage 30. In the exhaust passage 30, there is provided a three-way catalyst (hereinafter referred to as the catalyst) 31 capable of oxygen storage. When the air-fuel ratio of the exhaust flowing into the catalyst 31 equals the stoichiometric air-fuel ratio, the catalyst 31 purifies the exhaust by oxidizing carbon monoxide (hereinafter referred to as CO) and hydrocarbons (hereinafter referred to as HC) contained in the exhaust and purifies the exhaust by reducing nitrogen oxides (hereinafter referred to as NOx) also contained in the exhaust. Also, when the air-fuel ratio of the exhaust flowing into the catalyst 31 is higher than the stoichiometric air-fuel ratio, the catalyst 31 purifies the exhaust by reducing NOx and stores oxygen that has been taken away from NOx within the catalyst 31. When the air-fuel ratio of the exhaust flowing into the catalyst 31 is lower than the stoichiometric air-fuel ratio, on the other hand, the catalyst 31 releases oxygen that has been stored to purify the exhaust by oxidizing HC and CO by the released oxygen. This arrangement serves to maintain a state in which the exhaust is purified at a high conversion rate by making up for conditions where the amount of oxygen is excessive or insufficient by storing or releasing oxygen in the aforementioned manner even when the air-fuel ratio of the exhaust temporarily deviates from the stoichiometric air-fuel ratio.

Various operations for controlling the internal combustion engine 1 are performed by the electronic control unit 50.

The electronic control unit 50 includes a central processing unit (CPU) for performing mathematical operations for various kinds of control of the internal combustion engine 1, a read-only memory (ROM) storing various kinds of programs, maps, data, and so on in advance, a random access memory (RAM) for temporarily storing results of the mathematical operations performed by the CPU and results of detection by various kinds of sensors, a backup RAM for storing and retaining the results of the mathematical operations even after engine stop, and input/output ports (I/O) for interfacing input and output signals between the electronic control unit 50 and external circuitry.

Information on the results of detection by the sensors located in individual parts of the internal combustion engine 1, operating states of switches, and the like is input into the electronic control unit 50 thus configured. Specifically, there are provided an engine speed sensor 51 for detecting engine speed NE, an intake air amount sensor 52 for detecting intake air amount GA, a throttle opening sensor 53 for detecting the opening (hereinafter referred to as throttle opening) TA of the throttle valve 21. Also, on an upstream side of the catalyst 31 in the exhaust passage 30, there is provided an air-fuel ratio sensor 54 for detecting the air-fuel ratio of the exhaust that flows into the catalyst 31. Also, on a downstream side of the catalyst 31 in the exhaust passage 30, there is provided an oxygen sensor 55 for detecting the air-fuel ratio of the exhaust that flows out of the catalyst 31. Additionally, there is provided a catalyst temperature sensor 56 for detecting temperature TC of the catalyst 31. Besides these sensors, there are also provided various sensors like an accelerator depression sensor 57 for detecting the amount of depression by the accelerator pedal (accelerator stroke) ACCP. Meanwhile, the present embodiment employs a configuration in which the catalyst temperature sensor 56 directly detects the temperature TC of the catalyst 31. A temperature estimating section of the present invention is not limited to this configuration, however. For example, the invention may employ, instead of the aforementioned configuration, a configuration in which the temperature TC of the catalyst 31 is estimated on the basis of results of detection by an exhaust temperature sensor for detecting the temperature of the exhaust or a configuration in which which the temperature of the catalyst 31 is estimated on the basis of a value of integration of the intake air amount GA or the like.

Figure 2:
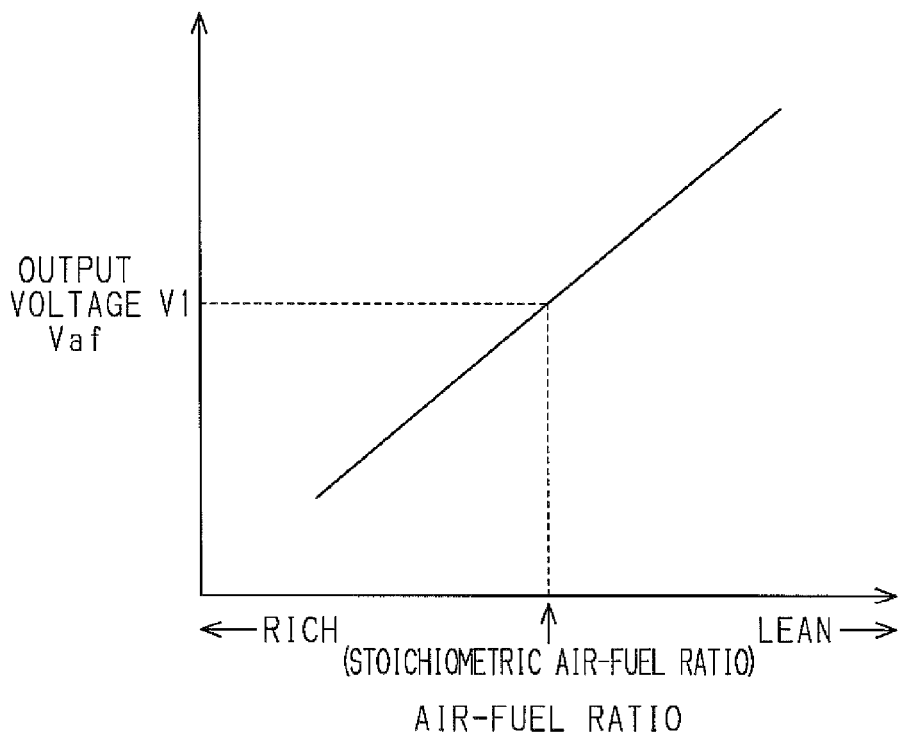
FIG. 2 is a graph representing output characteristics of an air-fuel ratio sensor.
Figure 3:
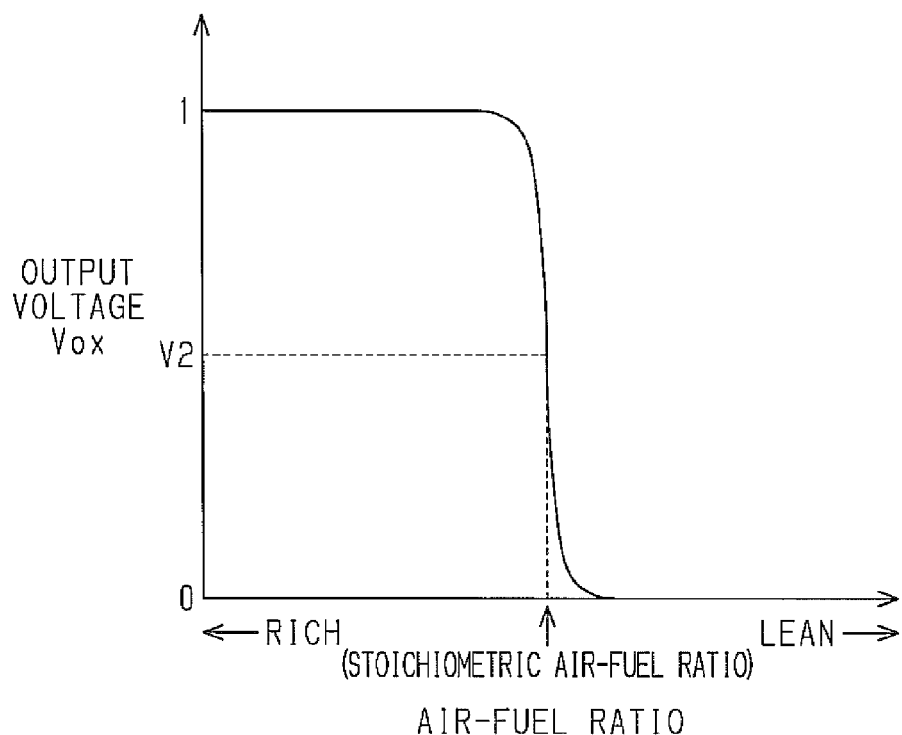
FIG. 3 is a graph representing output characteristics of an oxygen sensor.

Referring now to FIGS. 2 and 3, output characteristics of the air-fuel ratio sensor 54 and the oxygen sensor 55 are described. FIG. 2 is a graph representing a relationship between the air-fuel ratio of the exhaust and output voltage Vaf of the air-fuel ratio sensor 54, and FIG. 3 is a graph representing a relationship between the air-fuel ratio of the exhaust and output voltage Vox of the oxygen sensor 55.

As shown in FIG. 2, the air-fuel ratio sensor 54 is an all-range air-fuel ratio sensor. The higher the air-fuel ratio, that is, the leaner the air-fuel ratio, the higher the voltage Vaf output from the air-fuel ratio sensor 54. When the air-fuel ratio equals the stoichiometric air-fuel ratio, the air-fuel ratio sensor 54 outputs voltage V1.

As shown in FIG. 3, the oxygen sensor 55 is a zirconia-plate-type oxygen sensor. The oxygen sensor 55 outputs approximately 0 V when the air-fuel ratio of the exhaust is higher than the stoichiometric air-fuel ratio, and outputs approximately 1 V when the air-fuel ratio of the exhaust is lower than the stoichiometric air-fuel ratio. Also, when the air-fuel ratio of the exhaust varies from a value in a rich range to a value in a lean range (or from a value in the lean range to a value in the rich range) across the stoichiometric air-fuel ratio, the voltage Vox sharply varies. Incidentally, when the air-fuel ratio of the exhaust equals the stoichiometric air-fuel ratio, the oxygen sensor 55 outputs voltage V2, which is between 0 V and 1 V.

The electronic control unit 50 performs various kinds of control operations as described below, for example, on the basis of engine operating conditions or the like recognized from results of detection by various kinds of sensors including the aforementioned individual sensors 51-57. Specifically, the electronic control unit 50 calculates the fuel injection amount Q on the basis of the engine speed NE, the intake air amount GA, and the like, and performs fuel injection control operation to control the fuel injector 11 in accordance with the fuel injection amount Q.

Also, the electronic control unit 50 estimates the air-fuel ratio A/F of the mixture on the basis of the results of detection by the air-fuel ratio sensor 54, calculates an air-fuel ratio correction value to be applied to the fuel injection amount Q, and performs air-fuel ratio feedback control operation for correcting the to be injected by increasing or decreasing the same.

Incidentally, the catalyst 31 deteriorates as a result of poisoning by such components as lead and sulfur contained in the fuel. The catalyst thermally deteriorates as well when subjected to high-temperature conditions. The more the catalyst deteriorates, the more decreased becomes the oxygen-storing capability of the catalyst 31, or the maximum oxygen storage amount.

In the present embodiment, actual maximum oxygen storage amount CmaxA of the catalyst 31 is calculated as described in the following. Specifically, the electronic control unit 50 performs active air-fuel ratio control operation to forcibly alter the air-fuel ratio of the exhaust that flows into the catalyst 31 and calculates the actual maximum oxygen storage amount CmaxA of the catalyst 31 on the basis of the engine operating conditions and changes in the output of the oxygen sensor 55.

Figure 4:
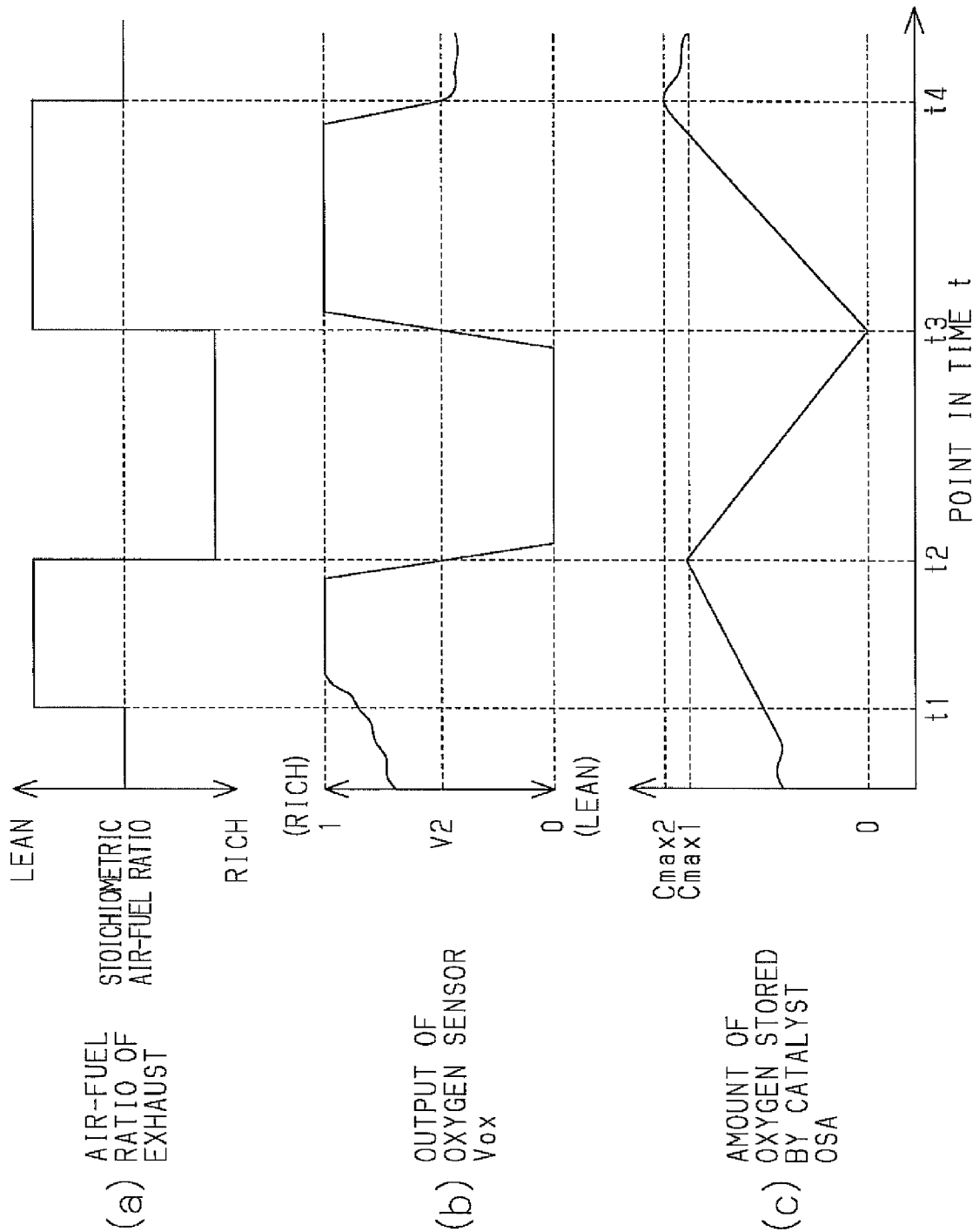
FIG. 4 is a timing chart, in which section (a) represents changes in the air-fuel ratio of an exhaust, section (b) represents changes in an output voltage of the oxygen sensor, and section (c) represents changes in the amount of oxygen stored by a catalyst during execution of active air-fuel ratio control operation of the present embodiment.

Referring now to FIG. 4, the active air-fuel ratio control operation is generally described. FIG. 4 is a timing chart, in which section (a) represents changes in the air-fuel ratio of the exhaust that flows into the catalyst, section (b) represents changes in the output voltage of the oxygen sensor, and section (c) represents changes in the amount of oxygen stored by the catalyst during execution of the active air-fuel ratio control operation. An example shown in FIG. 4 is based on the assumption that there is no abnormal response delay in the oxygen sensor 55. Also, an outline of the active air-fuel ratio control operation is the same as described earlier and, therefore, a description of an overlapping part of the operation is not provided hereunder.

As shown in FIG. 4, the amount of oxygen released from the catalyst 31 during a time period from point in time t2 to point in time t3 (hereinafter referred to as the first time period) corresponds to the maximum oxygen storage amount of the catalyst 31. Thus, the electronic control unit 50 calculates the amount of oxygen released from the catalyst 31 per unit time on the basis of the engine operating conditions, such as the amount of injected fuel Q and the air-fuel ratio A/F, and calculates maximum oxygen storage amount Cmax1 by integrating the amount of oxygen released per unit time over the first time period (t2 to t3). Also, the amount of oxygen that has flowed into the catalyst 31 during a time period from the point in time t3 to the point in time t4 (hereinafter referred to as the second time period) corresponds to the maximum oxygen storage amount of the catalyst 31. Thus, the electronic control unit 50 calculates the amount of oxygen that has flowed into the catalyst 31 per unit time on the basis of the engine operating conditions, and calculates maximum oxygen storage amount Cmax2 by integrating the amount of oxygen that has flowed into the catalyst 31 per unit time over the second time period (t3 to t4). A reason why the maximum oxygen storage amount Cmax during the aforementioned first time period and during the aforementioned second time period is indicated as having different values is that the temperature of the catalyst 31 differs between the first time period and the second time period. In this embodiment, an average value ((Cmax1+Cmax2)/2) of these maximum oxygen-storing amounts Cmax1, Cmax2 is calculated as the actual maximum oxygen storage amount CmaxA.

Figure 11:
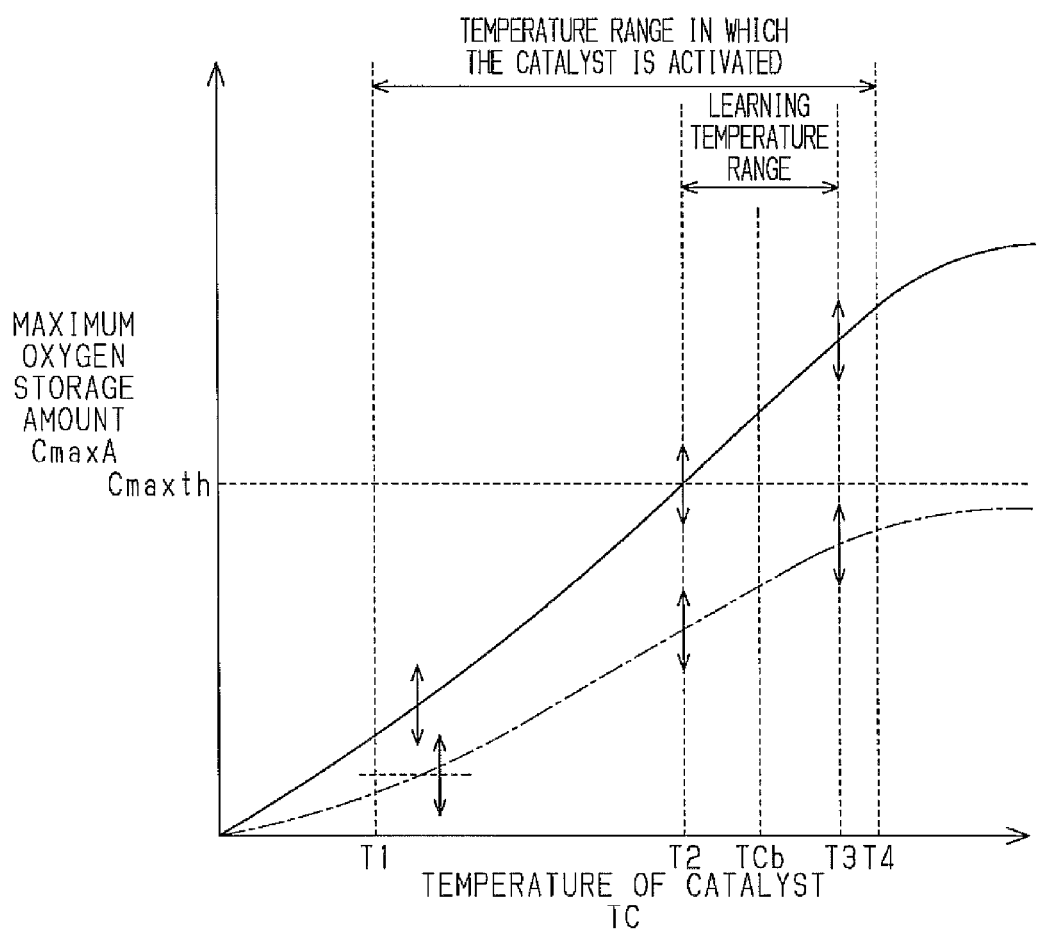
FIG. 11 is a graph representing a relationship between the temperature of each catalyst and a maximum oxygen storage amount thereof.
Figure 12:
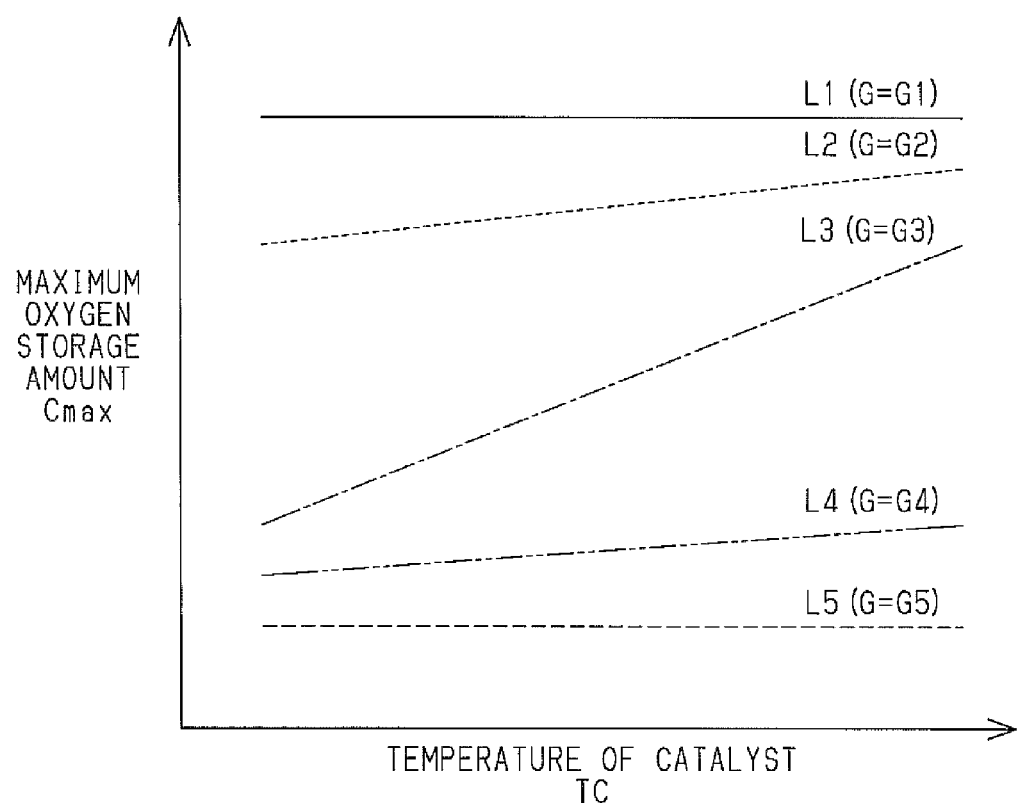
FIG. 12 is a graph representing a relationship between the temperature of each catalyst and the maximum oxygen storage amount thereof by a linear equation.
Figure 13:
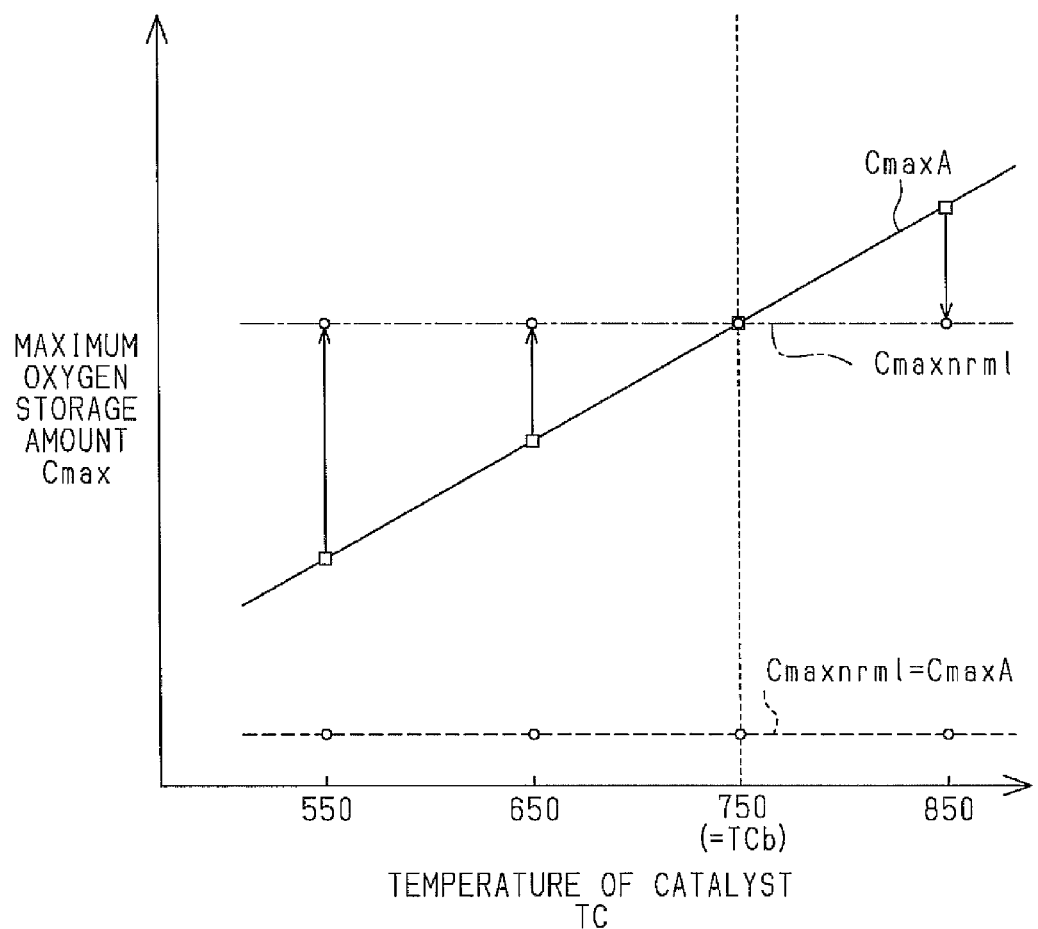
FIG. 13 is a graph representing a relationship among the temperature of each catalyst, an actual maximum oxygen storage amount and a corrected maximum oxygen storage amount.

Also, in a temperature range in which the catalyst 31 is activated to a certain extent, that is, a range in which the temperature TC of the catalyst is from T1 to T4 in the example of FIG. 11, the relationship between the temperature TC of the catalyst 31 and the maximum oxygen storage amount Cmax can be approximated by a linear equation and gradient G of the linear equation differs with the degree of degradation of the catalyst 31 as stated earlier. Focusing on these facts, opportunities for calculating the actual maximum oxygen storage amount CmaxA are increased in the below-described manner in the present embodiment.

A function satisfied by the temperature TC of the catalyst and the actual maximum oxygen storage amount CmaxA thereof, specifically, the gradient G of the linear equation, is determined in advance for each degree of degradation of the catalyst 31, and relationships between the temperature TC of the catalyst 31 and the actual maximum oxygen storage amount CmaxA and gradients G of linear equations that specify degrees of degradation of the catalyst 31 corresponding to these relationships are stored in the ROM of the electronic control unit 50 in the form of a map. The electronic control unit 50 determines the gradient G of the linear equation corresponding to the degree of degradation of the catalyst 31 on the basis of the actual maximum oxygen storage amount CmaxA calculated when the temperature TC of the catalyst is within a learning temperature range (T2<catalyst temperature TC<T3 in the example of FIG. 11) and the temperature TC of the catalyst during a period of calculation of the actual maximum oxygen storage amount CmaxA with reference to the aforementioned map so that the actual maximum oxygen storage amount CmaxA will not be calculated at the same value despite different degrees of degradation. The electronic control unit 50 also learns the gradient G thus determined by storing the same in the backup RAM. Then, when the actual maximum oxygen storage amount CmaxA of the catalyst 31 is calculated anew, the electronic control unit 50 corrects the calculated actual maximum oxygen storage amount CmaxA on the basis of the temperature TC of the catalyst during the same period of calculation, more specifically, an average value TCave of the temperature TC of the catalyst 31 during the period of calculation, a reference temperature TCb (T2<TCb<T3), equation (2) below which is a linear equation, and the already learned gradient G of the linear equation. In this way, the corrected maximum oxygen storage amount Cmaxnrml, which is the maximum oxygen storage amount that would be achieved if the temperature TCave of the catalyst has remained at the reference temperature TCb during the period of calculation, is calculated.

$$Cmaxnrml = CmaxA + G(TCb - TCave) \quad (2)$$

Figure 5:
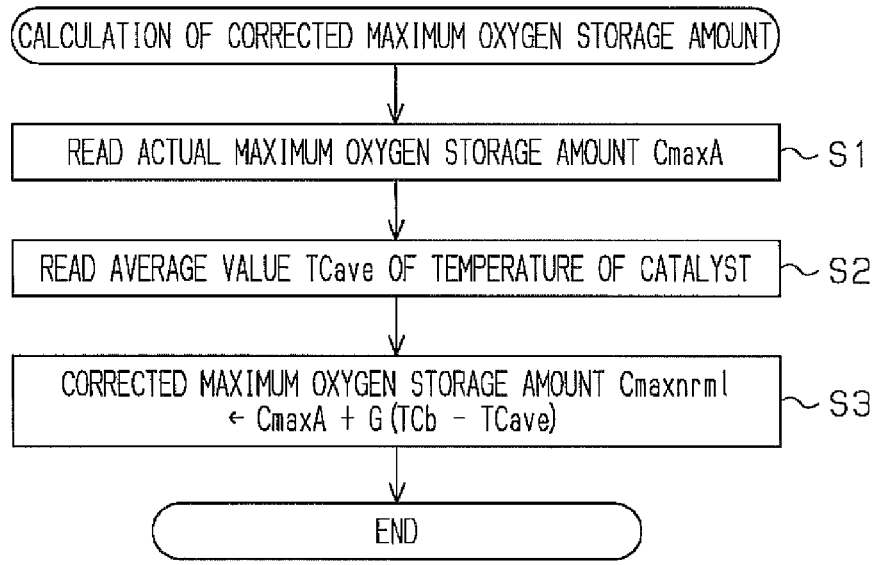
FIG. 5 is a flowchart depicting a procedure for calculating corrected maximum oxygen storage amount in the present embodiment.

Referring now to FIG. 5, an operating procedure for calculating the aforementioned corrected maximum oxygen storage amount Cmaxnrml is described. FIG. 5 is a flowchart depicting the same operating procedure. A sequence of operations indicated in this flowchart is executed each time the actual maximum oxygen storage amount CmaxA is calculated during operation of the internal combustion engine 1.

As shown in FIG. 5, the electronic control unit 50 first reads the actual maximum oxygen storage amount CmaxA, which has been calculated immediately before in step S1 of this sequence of operations. Then, proceeding to step S2, the electronic control unit 50 reads the average value TCave of the temperature of the catalyst 31 obtained during the period of calculation of the actual maximum oxygen storage amount CmaxA. Proceeding next to step S3, the electronic control unit 50 calculates the corrected maximum oxygen storage amount Cmaxnrml by substituting the actual maximum oxygen storage amount CmaxA and the average value TCave of the temperature of the catalyst 31 in equation (2) above, and then terminates the present sequence of operations.

Figure 6:
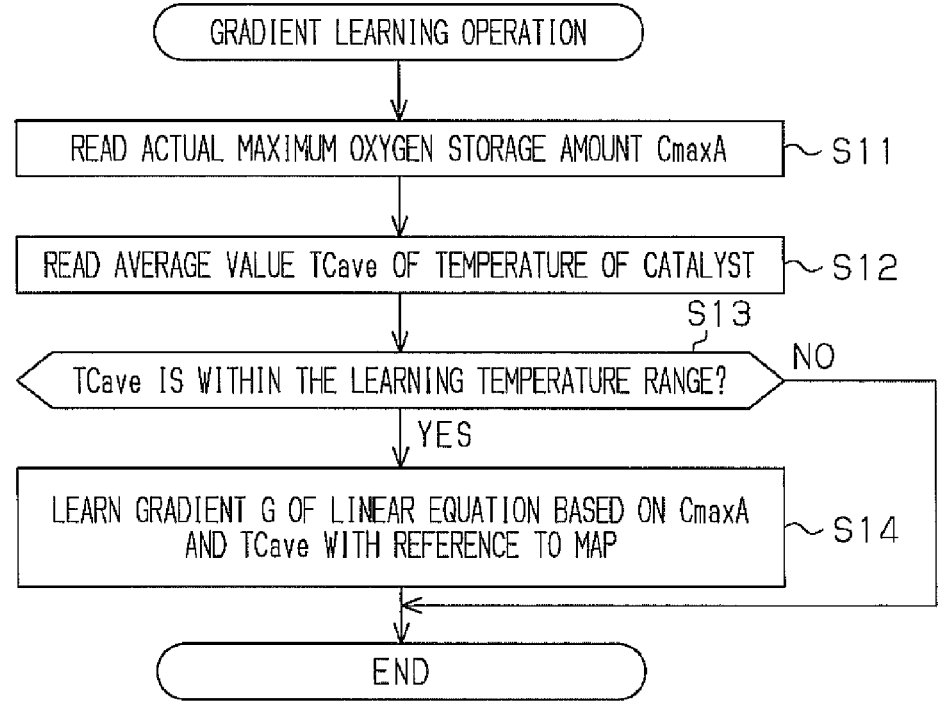
FIG. 6 is a flowchart depicting a procedure for performing gradient learning operation of the present embodiment.

Referring next to FIG. 6, an operating procedure for learning the aforementioned gradient G of the linear equation is described. FIG. 6 is a flowchart depicting the same operating procedure. A sequence of operations indicated in this flowchart is executed each time the actual maximum oxygen storage amount CmaxA is calculated during operation of the internal combustion engine 1.

As shown in FIG. 6, the electronic control unit 50 first reads the actual maximum oxygen storage amount CmaxA, which has been calculated immediately before in step S11 of this sequence of operations. Then, proceeding to step S12, the electronic control unit 50 reads the average value TCave of the temperature of the catalyst 31 obtained during the period of calculation of the actual maximum oxygen storage amount CmaxA. Proceeding next to step S13, the electronic control unit 50 determines whether or not the average value TCave of the temperature of the catalyst 31 falls within the learning temperature range. If the average value TCave of the temperature of the catalyst 31 falls within the learning temperature range (Yes in step S13), the electronic control unit 50 proceeds to step S14, in which the electronic control unit 50 determines the gradient G of the linear equation corresponding to the relationship between the actual maximum oxygen storage amount CmaxA and the average value TCave of the temperature of the catalyst 31, or corresponding to the degree of degradation of the catalyst 31, with reference to the aforementioned map, and learns the gradient G thus determined by storing the same in the backup RAM. Incidentally, a learning section according to the present invention is not limited to an arrangement in which the electronic control unit 50 learns the gradient G on the basis of only the actual maximum oxygen storage amount CmaxA, which has been read in learning operation performed immediately before and the temperature TCave of the temperature of the catalyst 31. As an example, the learning section may be configured such that the electronic control unit 50 learns the gradient G on the basis of data obtained N times in preceding calculation cycles including the actual maximum oxygen storage amount CmaxA, which has been calculated immediately before and the temperature TCave of the temperature of the catalyst 31.

If the average value TCave of the temperature of the catalyst 31 does not fall within the learning temperature range (No in step S13), on the other hand, the electronic control unit 50 determines that a current situation is not appropriate learning the gradient G and terminates the present sequence of operations.

According to the above-described configuration, in which the electronic control unit 50 determines the degree of degradation of the catalyst 31 on the basis of a comparison between the maximum oxygen storage amount of the catalyst 31 and a determination value by calculating the corrected maximum oxygen storage amount Cmaxnrml, it becomes unnecessary to prepare determination values for individual temperatures TC of the catalyst 31. This makes it possible to simplify determination of the degree of degradation of the catalyst 31.

In the exhaust purifying device for the internal combustion engine 1, there is a likelihood that a response delay may occur in the output Vox of the oxygen sensor 55 as previously mentioned. In such a case, the accuracy of calculation of the actual maximum oxygen storage amount CmaxA will decrease owing to the response delay of the output Vox of the oxygen sensor 55. Thus, the gradient G of the linear equation corresponding to the degree of degradation of the catalyst 31 is learned on the basis of the actual maximum oxygen storage amount CmaxA and the corrected maximum oxygen storage amount Cmaxnrml is calculated on the basis of the same gradient G. Consequently, a problem may arise that the corrected maximum oxygen storage amount Cmaxnrml cannot be calculated with high accuracy.

Under such circumstances, the present embodiment employs an arrangement to detect an abnormal response delay of the output Vox of the oxygen sensor 55 and discard the already learned gradients G of linear equations when an abnormal response delay is detected in the output Vox of the oxygen sensor 55. This arrangement serves to avoid a reduction in the accuracy of calculation of the corrected maximum oxygen storage amount Cmaxnrml caused by the occurrence of a response delay of the output Vox of the oxygen sensor 55.

Specifically, there is made an arrangement to detect a response time within which the output Vox of the oxygen sensor 55 changes to a voltage representative of a lean mixture during a fuel cutoff control operation and to detect a response delay time $\tau L$, which is the difference between the detected response time and a response time of the output Vox when the output Vox of the oxygen sensor 55 is normal. Additionally, there is made an arrangement to detect a response time within which the output Vox of the oxygen sensor 55 changes to a voltage representative of a rich mixture during execution of forcible enrichment control operation for forcibly making the air-fuel ratio of the exhaust lower than the stoichiometric air-fuel ratio and to detect a response delay time $\tau R$, which is the difference between the detected response time and a response time of the output Vox when the output Vox of the oxygen sensor 55 is normal.

Figure 7:
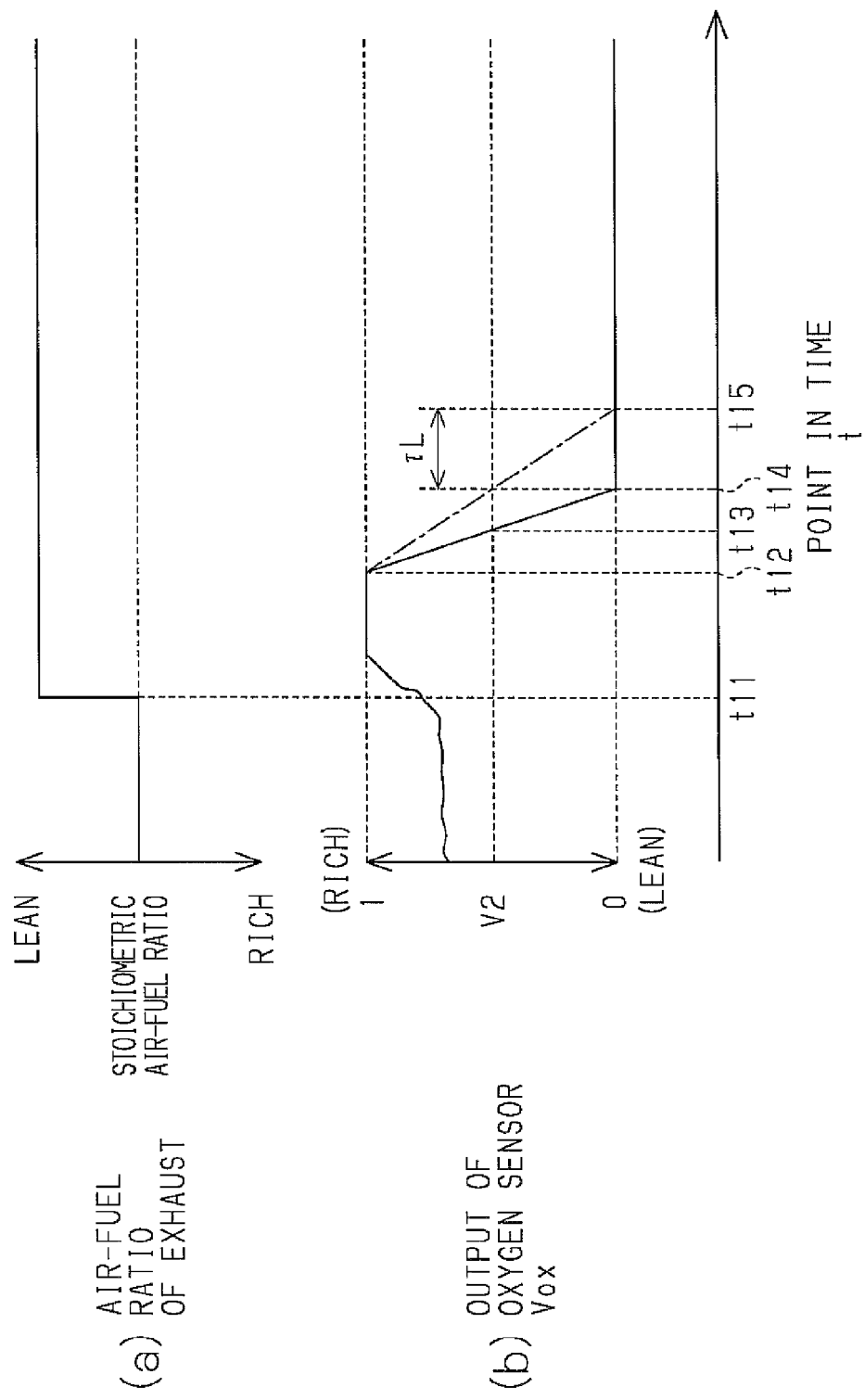
FIG. 7 is a timing chart, in which section (a) represents changes in the air-fuel ratio of the exhaust that flows into the catalyst and section (b) represents changes in the output of the oxygen sensor that occur during execution of fuel cutoff control operation of the present embodiment.

Described next with reference to FIG. 7 is how the response delay time τL that occurs when the output Vox of the oxygen sensor 55 changes to a voltage representative of a lean mixture is detected. FIG. 7 is a timing chart, in which section (a) represents changes in the air-fuel ratio of the exhaust that flows into the catalyst and section (b) represents changes in the output of the oxygen sensor that occur during execution of fuel cutoff control operation. In the drawing, a solid line indicates an example of changes in the output Vox of the normally operating oxygen sensor 55 and an alternate long and short dashed line indicates an example of changes in the output Vox of the oxygen sensor 55 of which response is delayed by a certain amount when the output Vox changes to a voltage representative of a lean mixture.

As shown in FIG. 7, when the fuel cutoff control operation is initiated at point in time t11, the air-fuel ratio of the exhaust that flows into the catalyst 31 becomes higher than the stoichiometric air-fuel ratio. Consequently, the catalyst 31 stores oxygen. When it becomes impossible for the catalyst to store any more oxygen, lean exhaust flows out on the downstream side of the catalyst 31. Thus, as indicated by the solid line in FIG. 7, the output Vox of the oxygen sensor 55 begins to lower at point in time t12, becomes equal to V2 at point in time t13 and reaches 0 V at point in time t14 (where the mixture changes to a lean state). If a specific response delay occurs when the mixture changes to the lean state, on the other hand, the output Vox of the oxygen sensor 55 begins to lower at point in time t12, becomes equal to V2 at point in time t14 and reaches 0 V at point in time t15 as indicated by the alternate long and short dashed line in FIG. 7. Here, using the normally operating oxygen sensor 55, a time period from the time when the output Vox of the oxygen sensor 55 begins to lower to the time when the output Vox reaches 0 V (reference response time Δtb=t14−t12) is measured beforehand. Then, during execution of the fuel cutoff control operation, a time period from the timing when the output Vox of the oxygen sensor 55 begins to lower to the time when the output Vox reaches 0 V (actual response time Δt=t15−t12) is measured, and a response delay time τ is calculated by subtracting the reference response time Δtb from the actual response time Δt.

Figure 8:
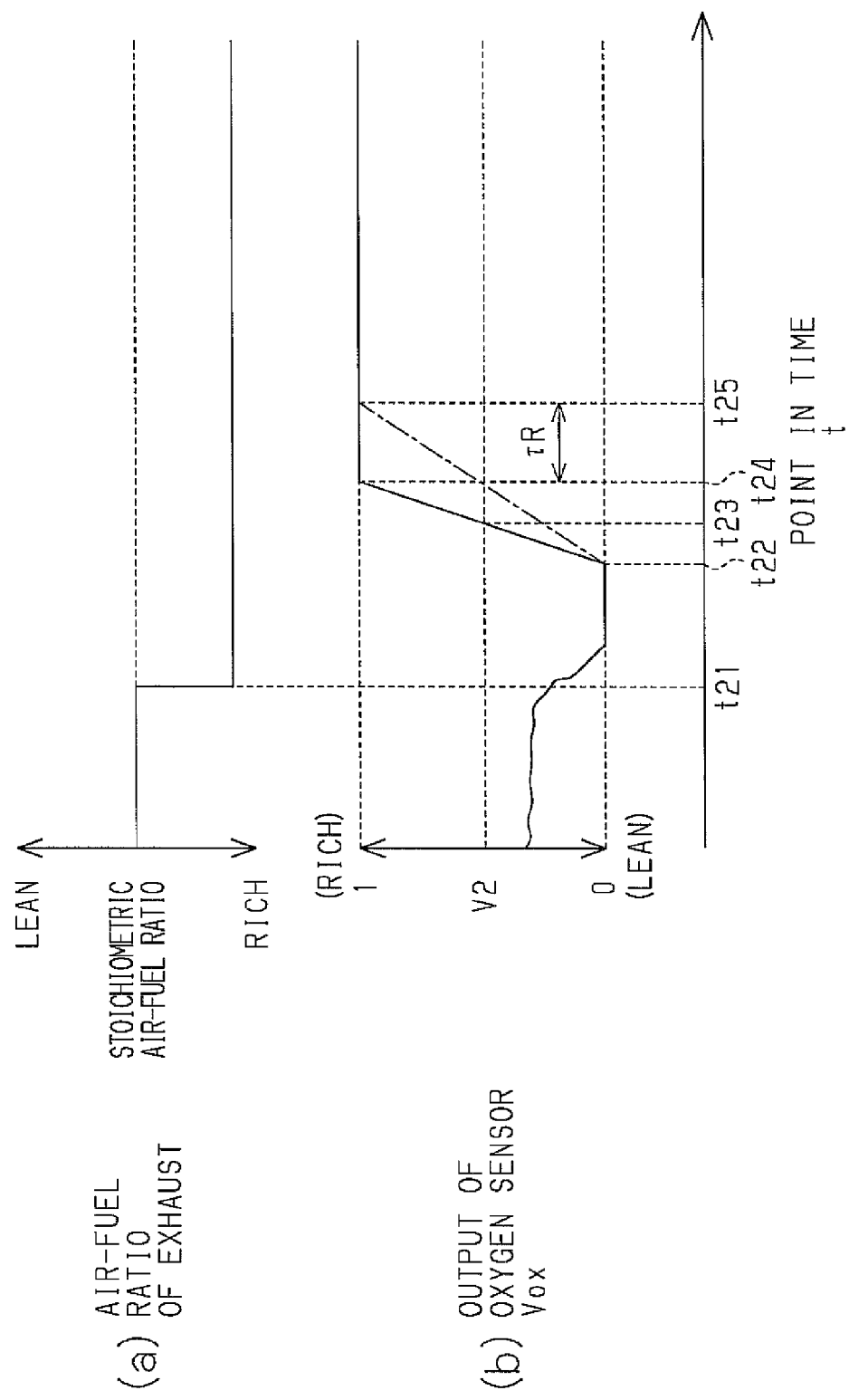
FIG. 8 is a timing chart, in which section (a) represents changes in the air-fuel ratio of the exhaust that flows into the catalyst and section (b) changes in the output of the oxygen sensor that occur during execution of forcible enrichment control operation of the embodiment.

Described next with reference to FIG. 8 is how the response delay time τR that occurs when the output Vox of the oxygen sensor 55 changes to a voltage representative of a rich mixture is detected. FIG. 8 is a timing chart, in which section (a) represents changes in the air-fuel ratio of the exhaust that flows into the catalyst and section (b) represents changes in the output of the oxygen sensor that occur during execution of the forcible enrichment control operation. In the drawing, a solid line indicates an example of changes in the output Vox of the normally operating oxygen sensor 55 and an alternate long and short dashed line indicates an example of changes in the output Vox of the oxygen sensor 55 of which response is delayed by a certain amount when the output Vox changes to a voltage representative of a rich mixture.

As shown in FIG. 8, when the forcible enrichment control operation is initiated at point in time t21, the air-fuel ratio of the exhaust that flows into the catalyst 31 becomes lower than the stoichiometric air-fuel ratio. Consequently, the catalyst 31 releases oxygen. When it becomes impossible for the catalyst to release any more oxygen, rich exhaust flows out on the downstream side of the catalyst 31. Thus, as indicated by the solid line in FIG. 8, the output Vox of the oxygen sensor 55 begins to rise at point in time t22, becomes equal to V2 at point in time t23 and reaches 1 V at point in time t24 (where the mixture changes to a rich state). If a specific response delay occurs when the mixture changes to the rich state, on the other hand, the output Vox of the oxygen sensor 55 begins to rise at point in time t22, becomes equal to V2 at point in time t24 and reaches 1 V at point in time t25 as indicated by the alternate long and short dashed line in FIG. 8. Here, using the normally operating oxygen sensor 55, a time period from the timing when the output Vox of the oxygen sensor 55 begins to rise to the timing when the output Vox reaches 1 V (reference response time Δtb=t24−t22) is measured beforehand. Then, during execution of the forcible enrichment control operation, a time period from the timing when the output Vox of the oxygen sensor 55 begins to rise to the timing when the output Vox reaches 1 V (actual response time Δt=t25−t22) is measured, and a response delay time τ is calculated by subtracting the reference response time Δtb from the actual response time Δt.

Figure 9:
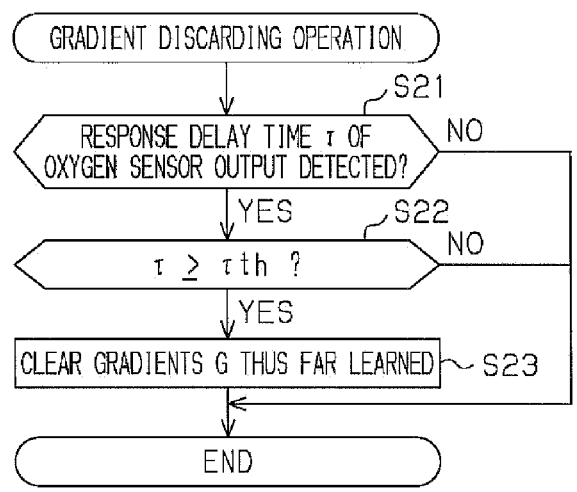
FIG. 9 is a flowchart depicting a procedure for performing gradient discarding operation of the present embodiment.
Figure 10:
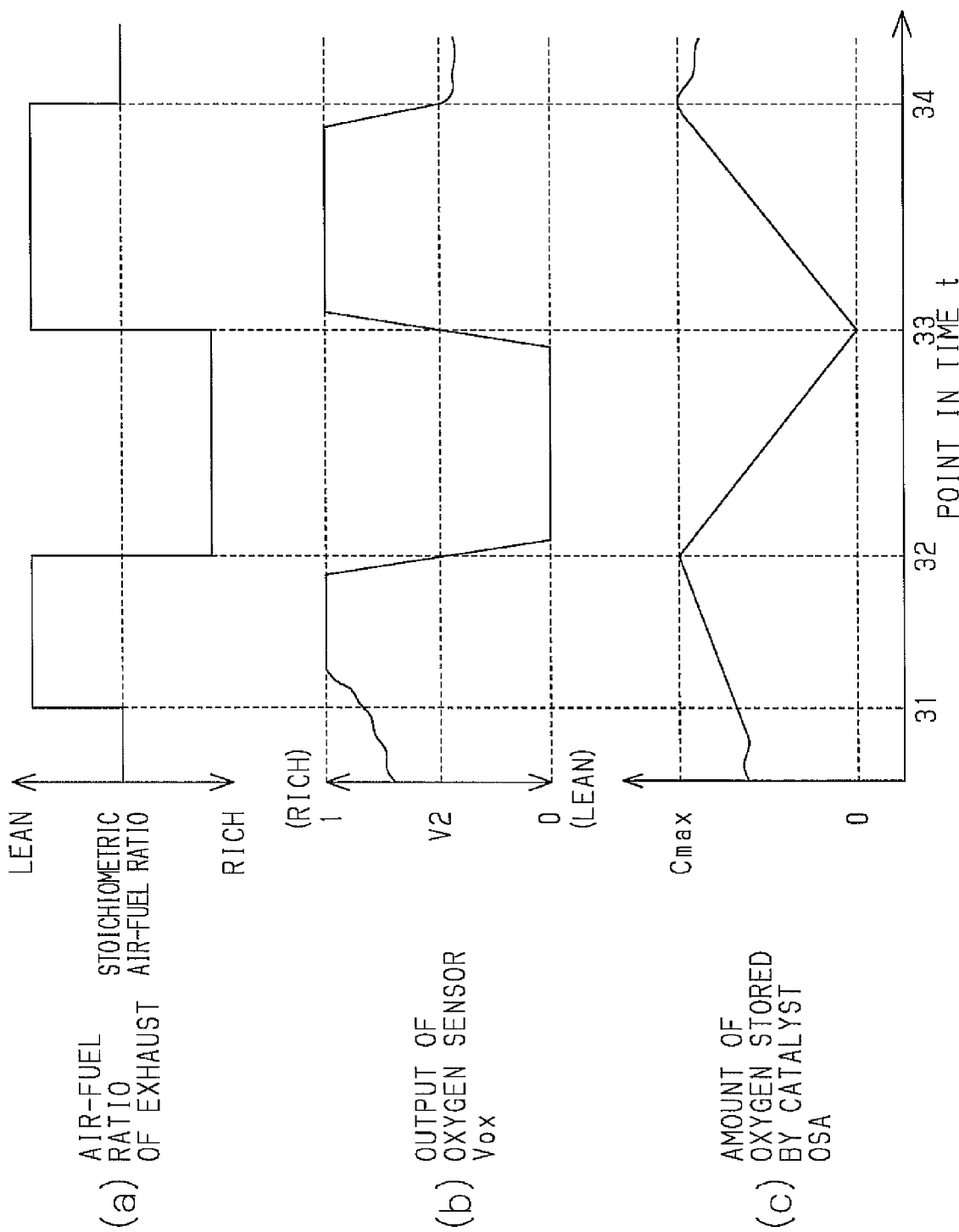
FIG. 10 is a timing chart, in which section (a) represents changes in the air-fuel ratio of the exhaust that flows into a catalyst, section (b) represents changes in an output voltage of an oxygen sensor, and section (c) represents changes in the amount of oxygen stored by the catalyst during execution of active air-fuel ratio control operation commonly performed in the prior art.

Referring next to FIG. 9, an operating procedure for discarding the aforementioned gradient G is described. FIG. 9 is a flowchart depicting the same operating procedure. A sequence of operations indicated in this flowchart is repeatedly executed at predetermined time intervals during operation of the internal combustion engine 1.

As shown in FIG. 9, the electronic control unit 50 first determines whether or not the response delay time τ (τL, τR) of the output Vox of the oxygen sensor 55 has been detected in step S21 of this sequence of operations. Specifically, the electronic control unit 50 determines whether or not the response delay time τ has been calculated anew during execution of the above-described fuel cutoff control operation or forcible enrichment control operation. If the response delay time τ has been detected (Yes in step S21), the electronic control unit 50 proceeds to step S22, in which the electronic control unit 50 determines whether or not the detected response delay time τ is equal to or longer than a predetermined time period τth. If the response delay time τ is equal to or longer than the predetermined time period τth (Yes in step S22), the electronic control unit 50 proceeds to step S23, in which the electronic control unit 50 determines that the reliability of the maximum oxygen storage amount Cmax of the catalyst 31 thus far calculated is low and the reliability of gradients G of linear equations learned on the basis of such maximum oxygen storage amount Cmax is low. In this case, the electronic control unit 50 discards the gradients G that have thus far been learned. Specifically, the electronic control unit 50 clears the gradients G that have been stored in the backup RAM and temporarily suspends the present sequence of operations. Meanwhile, it is preferable that the aforementioned predetermined time period τth be set at the same value as a maximum value of the response delay time τ that can allow a reduction in the accuracy of calculation of the actual maximum oxygen storage amount CmaxA. In this embodiment, the aforementioned predetermined time period τth is set through an experiment conducted by using the catalyst 31 and the oxygen sensor 55.

In contrast, if it is determined that the response delay time τ of the output Vox of the oxygen sensor 55 has not been detected (No in step S21) or if the response delay time τ is less than the predetermined time period τth (No in step S22), the electronic control unit 50 determines that conditions for discarding the gradients G that have thus far been learned are not satisfied and temporarily suspends the present sequence of operations.

Furthermore, the present embodiment employs an arrangement in which if the electronic control unit 50 has discarded the gradients G that have thus far been learned upon detecting an abnormal response delay of the output Vox of the oxygen sensor 55, the electronic control unit 50 takes into account the response delay time τ of the output Vox of the oxygen sensor 55 when calculating the actual maximum oxygen storage amount CmaxA of the catalyst 31 thereafter. This arrangement serves to avoid a reduction in the accuracy of calculation of the actual maximum oxygen storage amount CmaxA of the catalyst 31 caused by the fact that the gradients G that have been learned have been discarded.

According to the exhaust purifying device for an internal combustion engine of the embodiment thus far described, the below-described operational features and advantages are obtained.

The exhaust purifying device for the internal combustion engine 1 includes the catalyst 31 having the oxygen-storing capability that is located in the exhaust passage 30 and the oxygen sensor 55 located downstream of the catalyst 31 in an exhaust stream. The electronic control unit 50 calculates the actual maximum oxygen storage amount CmaxA of the catalyst 31 on the basis of the engine operating conditions and changes in the output of the oxygen sensor 55. Also, the electronic control unit 50 stores in advance the gradients G of linear equations satisfied by the temperature TC of the catalyst 31 and the maximum oxygen storage amount Cmax of the catalyst 31 at the same temperature when the catalyst 31 is at predetermined degrees of degradation for the individual degrees of degradation of the catalyst 31. Further, if the temperature TC of the catalyst 31 falls within a predetermined learning temperature range during the period of calculation when the maximum oxygen storage amount Cmax of the catalyst 31 has been calculated, the electronic control unit 50 learns the gradient G of the linear equation corresponding to the degree of degradation of the catalyst at that time on the basis of the temperature TC of the catalyst 31 and the actual maximum oxygen storage amount CmaxA. Additionally, the electronic control unit 50 corrects the calculated actual maximum oxygen storage amount CmaxA on the basis of the temperature TC of the catalyst 31 during the same period of calculation, the reference temperature TCb, the linear equation, and the already learned gradient G of the linear equation in order to calculate the corrected maximum oxygen storage amount Cmaxnrml, which is the maximum oxygen storage amount that would be achieved if the temperature TC of the catalyst 31 has remained at the reference temperature TCb during the period of calculation when the actual maximum oxygen storage amount CmaxA of the catalyst 31 has been calculated. Then, there is provided the arrangement to detect an abnormal response delay of the output Vox of the oxygen sensor 55 and discard the already learned gradients G of linear equations when an abnormal response delay is detected in the output Vox of the oxygen sensor 55. With this arrangement, when an abnormal response delay of the output Vox of the oxygen sensor 55 has been detected, the electronic control unit 50 determines that the reliability of the maximum oxygen storage amount Cmax of the catalyst 31 calculated before this detection is low and the reliability of gradients G of linear equations learned on the basis of such maximum oxygen storage amount Cmax is low, and thus discards the gradients G that have thus far been learned. For this reason, it becomes possible to prevent a situation in which the corrected maximum oxygen storage amount Cmaxnrml of the catalyst 31 is calculated on the basis of the gradients G having low reliability. Therefore, it is made possible to avoid a reduction in the accuracy of calculation of the corrected maximum oxygen storage amount Cmaxnrml caused by the occurrence of a response delay of the output Vox of the oxygen sensor 55.

Incidentally, the exhaust purifying device for an internal combustion engine according to the present invention is not limited to the configuration illustrated in the foregoing embodiment but may be implemented in properly modified forms as described below, for example.

While a zirconia-plate-type oxygen sensor is employed as the oxygen sensor 55 located downstream of the catalyst 31 in the exhaust stream in the above-described embodiment, the present invention is not limited thereto. For example, an all-range air-fuel ratio sensor may be employed as the oxygen sensor. Also, the air-fuel ratio sensor located upstream of the catalyst 31 in the exhaust stream is not an essential constituent element but the same oxygen sensor as the oxygen sensor 55 may be provided instead.

While the maximum oxygen storage amount Cmax of the catalyst 31 is calculated on the basis of the engine operating conditions, such as the fuel injection amount Q and the air-fuel ratio A/F of the exhaust in the foregoing embodiment, this configuration may be modified to calculate the maximum oxygen storage amount Cmax of the catalyst 31 on the basis of the intake air amount GA detected by the intake air amount sensor 52.

Although the maximum oxygen-storing amounts Cmax1, Cmax2 of the catalyst 31 are calculated during execution of the active air-fuel ratio control operation in the foregoing embodiment, the calculating section according to the present invention is not limited to this configuration but may be configured to calculate the maximum oxygen storage amount Cmax during execution of the fuel cutoff control operation or during execution of the forcible enrichment control operation performed after the fuel cutoff control operation, for example. Also, the invention is not limited to an arrangement in which the maximum oxygen storage amount of the catalyst is calculated in a process of controlling the air-fuel ratio of the exhaust to forcibly produce rich or lean exhaust as discussed above. What is essential is that the maximum oxygen storage amount of the catalyst 31 should be calculated on the basis of the engine operating conditions and changes in the output of the oxygen sensor 55.

The foregoing embodiment is configured to utilize the fact that the relationship between the temperature TC of the catalyst 31 and the maximum oxygen storage amount Cmax thereof when the catalyst 31 is at a specific degree of degradation can be approximated by a linear equation and to learn the gradient G of the linear equation by means of the electronic control unit 50. The learning section according to the present invention, however, is not limited to this configuration. If the aforementioned relationship can be approximated by another approximate expression, such as a quadratic equation, the electronic control unit 50 only needs to be configured to learn a coefficient of the approximate expression.

DESCRIPTION OF THE REFERENCE NUMERALS

1: Internal combustion engine
10: Combustion chamber
11: Fuel injector
20: Intake passage
21: Throttle valve
30: Exhaust passage
31: Catalyst
50: Electronic control unit (Memory section, Correcting section, Detecting section, Discarding section)
51: Engine speed sensor
52: Intake air amount sensor
53: Throttle opening sensor
54: Air-fuel ratio sensor
55: Oxygen sensor
56: Catalyst temperature sensor
57: Accelerator depression sensor

The invention claimed is:

1. An exhaust purifying device comprising:
a catalyst that is capable of oxygen storage and is located in an exhaust passage of an internal combustion engine;
an oxygen sensor located in the exhaust passage downstream of the catalyst in an exhaust stream; and
an electronic control unit, wherein
the electronic control unit includes:
a calculating section, which calculates a maximum oxygen storage amount of the catalyst on the basis of an engine operating condition and changes in an output of the oxygen sensor;
a learning section, which learns a function regarding the oxygen storage amount of the catalyst on the basis of the maximum oxygen storage amount calculated by the calculating section;
a correcting section, which corrects the maximum oxygen storage amount calculated by the calculating section on the basis of the maximum oxygen storage amount calculated by the calculating section and the function, thereby calculating a corrected maximum oxygen storage amount; and
a discarding section, which discards the function already learned by the learning section when a response delay of the output of the oxygen sensor is longer than or equal to a predetermined time period, and
when the discarding section discards the function, the electronic control unit calculates the corrected maximum oxygen storage amount by taking into account the response delay time of the output of the oxygen sensor thereafter.

2. The exhaust purifying device for the internal combustion engine according to claim 1, wherein, when the response delay time of the output of the oxygen sensor is shorter than the predetermined time period, the electronic control unit calculates the corrected maximum oxygen storage amount without taking into account the response delay time of the output of the oxygen sensor.

3. The exhaust purifying device for the internal combustion engine according to claim 1, wherein, when the discarding section discards the function, the calculating section calculates the corrected maximum oxygen storage amount by taking into account the response delay time of the output of the oxygen sensor thereafter.

4. The exhaust purifying device for the internal combustion engine according to claim 1, wherein the electronic control unit determines a degree of degradation of the catalyst on the basis of the corrected maximum oxygen storage amount of the catalyst.

5. The exhaust purifying device for the internal combustion engine according to claim 1, wherein
the function is satisfied between a temperature of the catalyst and the maximum oxygen storage amount of the catalyst at the same temperature at a specific degree of degradation of the catalyst, and
the electronic control unit includes a memory section, which stores in advance the function for each degree of degradation of the catalyst.

* * * * *